United States Patent [19]

Yuda

[11] E Patent Number: Re. 33,317

[45] Reissued Date of Patent: Aug. 28, 1990

[54] ROBOTIC GRIPPER

[76] Inventor: Lawrence F. Yuda, P.O. Box 176, Westminster, S.C. 29693

[21] Appl. No.: 223,687

[22] Filed: Jul. 25, 1988

Related U.S. Patent Documents

Reissue of:

[64] Patent No.: 4,566,727
Issued: Jan. 28, 1986
Appl. No.: 672,861
Filed: Nov. 19, 1984

U.S. Applications:

[63] Continuation of Ser. No. 892,921, Aug. 4, 1986, abandoned, which is a continuation of Ser. No. 472,714, Mar. 7, 1983, abandoned.

[51] Int. Cl.[5] ..... B25J 15/08

[52] U.S. Cl. ..... 294/88; 294/115; 901/37

[58] Field of Search ..... 294/88, 95, 97, 106, 294/115, 116; 74/99 R, 99 A; 269/34, 218, 233, 234; 414/739, 753; 901/31, 36–39

[56] References Cited

U.S. PATENT DOCUMENTS

| | | | |
|---|---|---|---|
| 2,853,905 | 9/1958 | Reisacher et al. | 294/88 X |
| 3,075,800 | 1/1963 | Rowekamp | 294/88 |
| 3,386,297 | 6/1968 | Willis | 294/88 X |
| 3,493,137 | 2/1970 | Nilsen et al. | 294/115 X |
| 4,211,123 | 7/1980 | Mack | 294/116 X |
| 4,234,223 | 11/1980 | O'Neil | 294/116 X |
| 4,304,433 | 12/1981 | Langowski | 294/115 X |
| 4,348,044 | 9/1982 | Wood | 294/115 X |

*Primary Examiner*—Johnny D. Cherry
*Attorney, Agent, or Firm*—Bailey & Hardaway

[57] ABSTRACT

A robotic gripper is described having opposed fingers which are positively opened and closed through the use of a bushing, powered for a limited stroke up and down by fluid pressure, wherein the bushing is carried within a recess closely conforming thereto in the fingers, and an overlapping or over-gripping action of the fingers is provided by reason of slightly tapering opposed engaging surfaces carried by the grippers.

2 Claims, 2 Drawing Sheets

Fig. 5.
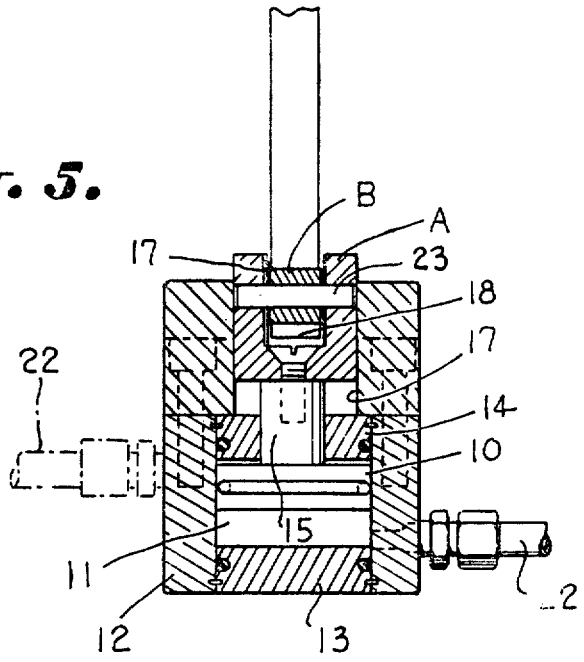
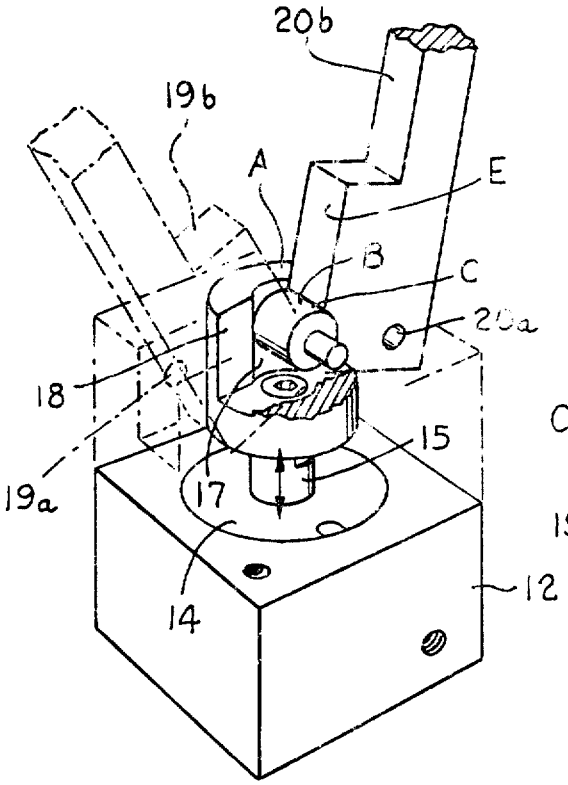
Fig. 6.
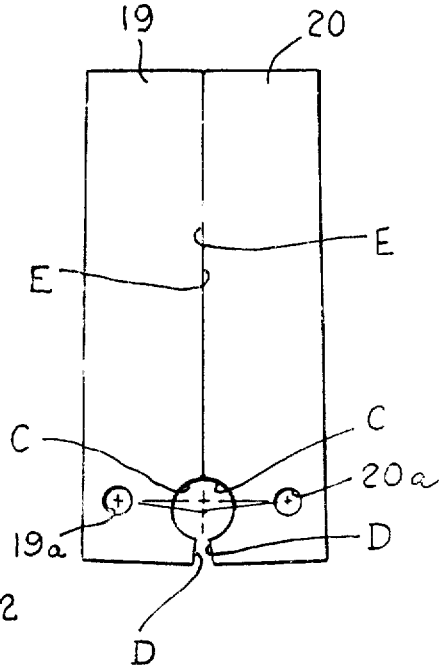
Fig. 7.

ROBOTIC GRIPPER

Matter enclosed in heavy brackets [ ] appears in the original patent but forms no part of this reissue specification; matter printed in italics indicates the additions made by reissue.

[This application is a continuation of application Ser. No. 472,714 filed Mar. 7, 1983, now abandoned.] *This application is a continuation of U.S. Ser. No. 06/892,921 filed Aug. 4, 1986, now abandoned, which in turn is a reissue of U.S. Ser. No. 06/672,861 filed Nov. 19, 1984, now U.S. Pat. No. 4,566,727 granted Jan. 28, 1986, which is a continuation of U.S. Ser. No. 06/472,714 filed Mar. 7, 1983 now abandoned.*

BACKGROUND OF THE INVENTION

Robotic fingers or jaws are commonly employed in a variety of pick and place apparatuses. Such apparatus often has a bushing carried within recesses within the pivoted portions of the fingers such as illustrated in U.S. Pat. Nos. 4,211,123 and 4,234,223 for opening and closing the jaws. These patents respectively show recesses within the fingers or jaws forming camming surfaces for a flat bushing in the first instance, and in the second instance there is a recess of limited extent for accommodating a bushing which centers itself as it slides back and forth within a slot. Other United States Patents illustrating the state of the art include: U.S. Pat. Nos. 228,557; 344,222; 604,973 and 4,234,223.

An important object of this invention, therefore, is to provide an improved robotic gripper wherein a bushing positioned in a recess which conforms thereto for producing movement in the jaws directly responsive movement of the power actuating mechanism on both open and closing strokes thereof.

Another important object of the invention is to provide robotic fingers operated by a bushing carried in a recess within the fingers to provide a power multiplier which is enhanced through over-gripping of the fingers.

SUMMARY OF THE INVENTION

It has been found that a robotic gripper may be provided wherein a fluid power actuator may control the opening and closing of opposed pivoted fingers through the use of a cylindrical bushing carried within a conforming arcuate recess within the fingers. Opposed relieved portions are provided on the fingers extending from the arcuate recesses tapering outwardly to an extent that outward pivotal movement of the fingers is permitted through a full power stroke with the opposed tapering surfaces acting thereafter as stops to prevent further opening of the fingers. An over-gripping action of the fingers is provided through upwardly tapering opposed contracting surfaces.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is a transverse sectional elevation taken on the line 5—5 in FIG. 3, FIG. 6 is a perspective view further illustrating the form of the invention of FIG. 3 with parts illustrated in broken lines, and FIG. 7 is an enlarged front elevation illustrating robotic fingers constructed in accordance with the present invention.

DESCRIPTION OF A PREFERRED EMBODIMENT

Figure 1:
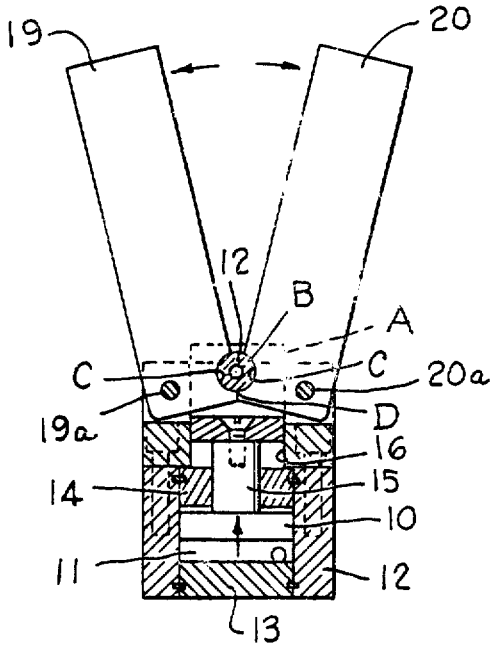
FIG. 1 is a front sectional elevation illustrating a power actuator for moving a clevis bracket up and down within a reduced portion of the housing which is occupied by the power actuator with mounting and operating means for the fingers.
Figure 2:
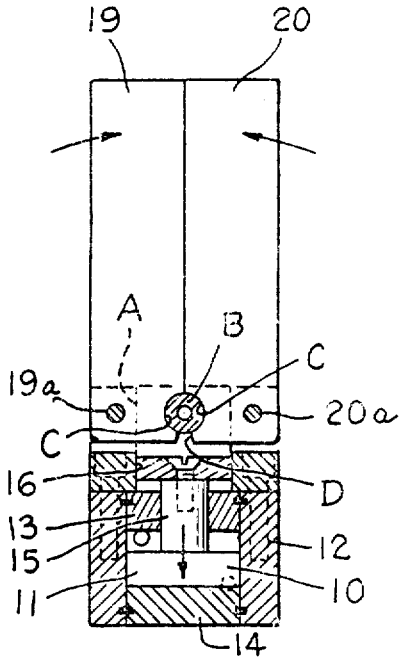
FIG. 2 is a front elevation similar to FIG. 1 illustrating the fingers in closed or gripping position.

The drawings illustrate a robotic gripper having a cylinder within a housing containing a fluid actuator applying a limited axial power stroke to a clevis bracket A carried within a reduced portion of the housing. A transverse cylindrical bushing B is carried within the clevis bracket. A pair of opposed fingers are each pivotally mounted adjacent one end thereof within the housing on opposite sides of the bushing. The fingers have opposed surfaces each having an arcuate recess C therein substantially entirely conforming to and receiving the bushing. A relieved portion D is provided on each of the fingers carried within the housing extending from the arcuate recesses tapering outwardly to an extend that outward pivotal movement of the fingers is permitted through a full power stroke of the fluid actuator. The bushing and the pivot points are in substantial alignment when the fingers are approaching closed position with the opposed surfaces tapering outwardly as at E permitting further movement of the bushing above the pivot points providing over-gripping of the fingers.

The robotic gripper illustrated in the drawings has a power actuator in the form of a piston 10 carried within a cylinder 11 in the housing 12 for applying a limited axial powder stroke to the clevis bracket A. The power actuator is of the type illustrated in U.S. Pat. No. 4,167,134, the disclosure of which is incorporated herein and made a part hereof by reference. Each end of the cylinder within the housing 12 is closed as by inserts 13 and 14. The clevis bracket is carried as by a piston rod 15 within a reduced portion of the housing illustrated at 16.

Figure 3:
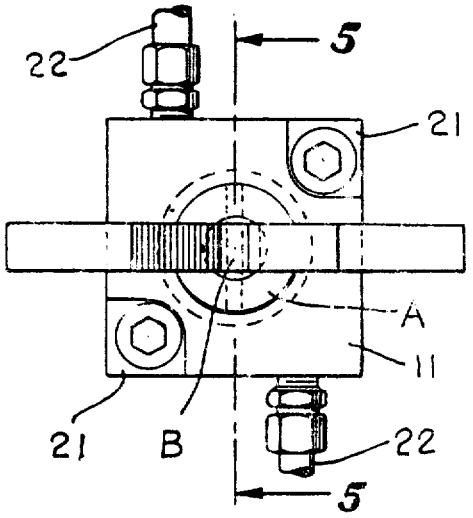
FIG. 3 is a plan view further illustrating the robotic gripper of FIGS. 1 and 2.
Figure 4:
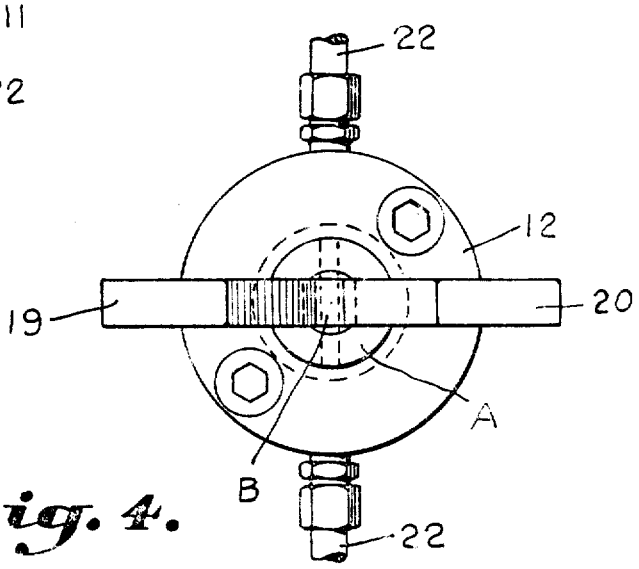
FIG. 4 is a plan view illustrating a modified form of the invention wherein a round housing is provided.

The clevis bracket A has a central bore or opening 17 (FIGS. 5 and 6) as well as a transverse slot 18 for accommodating the pivoted fingers 19 and 20. The fingers respectively have pivotal connection as at 19a and 20a within respective relieved portions of the housing illustrated at 21 (FIG. 3). The greater the distance between the respective pivot points and the bushing the greater is the power multiplier.

Suitable air supply connections are illustrated at 22 with the cylinder above and below the piston for raising and lowering the bushing B on a power stroke to open and close the fingers or jaws 19 and 20 by effecting pivotal movement about the respective pivot points 19a and 20a. It will be noted that the bushing B has a shaft 23 which extends therethrough and has ends projecting on each side of the cylindrical bushing member B which are journaled within the sides of the clevis bracket A so that the cylindrical bushing is carried within the open bowl formed by the bore within the clevis bracket. If desired the shaft may be integral with the bushing rather than a separate member.

The bushing is carried within a closely conforming arcuate recess C within opposed portions of the fingers 19 and 20. A relieved portion D is provided on each of the fingers carried within the housing extending from the arcuate recess tapering outwardly to an extent that outward pivotal movement of the fingers is permitted through a full power stroke of the fluid actuator 10. The relieved portions D may, after the power stroke, act as stops to limit further opening of the fingers. Preferably the tapering portions D, which are best seen in FIG. 7, taper outwardly originating at the center of the arctuate recesses C within opposed surfaces of the fingers when in engaging or gripping position.

It will be noted that the bushing and the pivot points 19a and 20a are in substantial alignment when the fingers are approaching closed position but that the opposed contacting surfaces of the fingers taper outwardly as at E permitting further movement of the bushing beyond the pivot points so as to be out of alignment with the pivot, as illustrated in FIG. 7, points providing over-gripping of the fingers. If desired the fingers may be simply relieved in order to provide the desired over-gripping rather than tapering. FIG. 6 illustrates a slightly modified form of gripping wherein outward opposite portions are recessed as at 19b and 20b, in the event that larger objects are to be accommodated. However, the recess portion may be utilized in order to provide an over-gripping action.

While a preferred embodiment of the invention has been described using specific terms, such description is for illustrative purposes only and it is to be understood that changes and variations may be made without departing from the spirit or scope of the following claims.

What is claimed is:

1. A robotic gripper having a cylinder within a housing containing a fluid actuator supplying a limited axial power stroke to a clevis bracket carried within a reduced portion of the housing comprising:

a transverse cylindrical bushing carried within said clevis bracket;

said cylindrical bushing having a shaft extending from each end and being journated within said clevis bracket;

a pair of opposed fingers each pivotally mounted adjacent one end thereof within said housing on opposite sides of said bushing about spaced respective pivot points;

said fingers having opposed surfaces each having an arcuate recess therein substantially entirely conforming to and receiving said bushing; and a relieved portion on each of said fingers carried within said housing extending from said arcuate recesses tapering outwardly to an extent that outward movement of said fingers is permitted through a full power stroke of said fluid actuator; and said bushing and said pivot points being in substantial alignment when said fingers are approaching closed position with said opposed surfaces tapering outwardly permitting further forceful movement of the bushing beyond the pivot points providing overgripping and forceful engagement of the oppose tapering surfaces of the fingers;

whereby said relieved portions may act as stops to limit further opening of the fingers.

*2. A robotic gripper having a cylinder within a housing containing a fluid actuator supplying a limited axial power stroke to a clevis bracket carried within a reduced portion of the housing comprising:*

*a transverse cylindrical bushing carried within said clevis bracket;*

*said cylindrical bushing having a shaft extending from each end and being journated within said clevis bracket;*

*a pair of opposed fingers each pivotally mounted adjacent one end thereof within said housing on opposite sides of said bushing about spaced respective pivot points;*

*said fingers having opposed surfaces each having an arcuate recess therein substantially entirely conforming to and receiving said bushing; and*

*a relieved portion on each of said fingers carried within said housing beginning along the edges of said arcuate recesses closest to said fluid actuator and continuing outwardly such that outward movement of said fingers is permitted through a full power stroke of said fluid actuator; and*

*said bushing and said pivot points being in substantial alignment when said fingers are approaching closed position; and*

*said spaced respective pivot points on opposite sides of the bushing being spaced past alignment with a midpoint of the bushing in a direction away from the relieved portion of each of said fingers when said fingers are in a closed position permitting further forceful movement of the bushing beyond the pivot points providing forceful engagement of opposed surfaces between the fingers;*

*whereby overgripping of the fingers is provided.*

* * * * *